United States Patent
Sim et al.

(10) Patent No.: US 9,668,466 B2
(45) Date of Patent: Jun. 6, 2017

(54) APPARATUS FOR ATTACHING AND DETACHING A COVER OF A BAIT CASTING REEL

(71) Applicant: COCUS CO., LTD., Bucheon-si, Gyeonggi-do (KR)

(72) Inventors: Eun Ki Sim, Incheon (KR); Jung Hyun Nam, Incheon (KR)

(73) Assignee: COCUS CO., LTD., Bucheon-si (KR)

( * ) Notice: Subject to any disclaimer, the term of this patent is extended or adjusted under 35 U.S.C. 154(b) by 0 days.

(21) Appl. No.: 15/003,552

(22) Filed: Jan. 21, 2016

(65) Prior Publication Data
US 2016/0366866 A1    Dec. 22, 2016

(30) Foreign Application Priority Data
Jun. 18, 2015   (KR) .................. 10-2015-0086368

(51) Int. Cl.
*A01K 89/01*    (2006.01)
*A01K 89/015*   (2006.01)

(52) U.S. Cl.
CPC .................. *A01K 89/01921* (2015.05)

(58) Field of Classification Search
CPC ............ A01K 89/015; A01K 89/01921; A01K 89/01923
See application file for complete search history.

(56) References Cited

U.S. PATENT DOCUMENTS

| | | | | |
|---|---|---|---|---|
| 5,370,331 A | * | 12/1994 | Sato | A01K 89/015 242/313 |
| 5,372,324 A | * | 12/1994 | Sato | A01K 89/015 242/289 |
| 5,377,925 A | * | 1/1995 | Miyazaki | A01K 89/015 242/312 |
| 5,839,682 A | * | 11/1998 | Kim | A01K 89/015 242/314 |
| 6,095,444 A | * | 8/2000 | Miyazaki | A01K 89/015 242/310 |
| 6,460,793 B1 | * | 10/2002 | Hirayama | A01K 89/015 242/313 |
| 6,464,158 B1 | * | 10/2002 | Sakurai | A01K 89/006 242/283 |
| 2005/0224617 A1 | * | 10/2005 | Nakagawa | A01K 89/015 242/310 |
| 2013/0320125 A1 | * | 12/2013 | Hyun | A01K 89/015 242/312 |
| 2014/0158803 A1 | * | 6/2014 | Hyun | A01K 89/015 242/310 |

* cited by examiner

*Primary Examiner* — Emmanuel M Marcelo
(74) *Attorney, Agent, or Firm* — Morgan, Lewis & Bockius LLP

(57) ABSTRACT

Disclosed is an apparatus for attaching and detaching a cover of a bait casting reel piezoelectric drive circuit. The apparatus includes a reel main body which is formed with an opening portion on one side, and inside which a spool is rotatably installed; a reel cover which supports the rotation of the spool, and opens and closes the opening portion by horizontally moving from one side of the reel main body so that the spool is separated from the reel main body; and a holder which connects the reel main body with the reel cover, projects from the reel main body to guide an opening and closing path of the reel cover when the opening portion is opened, and is coupled with the reel cover by a magnetic body internally provided to fix a separation position of the reel cover.

6 Claims, 4 Drawing Sheets

APPARATUS FOR ATTACHING AND DETACHING A COVER OF A BAIT CASTING REEL

CROSS-REFERENCE TO RELATED APPLICATION

The present application claims priority to Korean Patent Application No. 10-2015-0086368 filed on Jun. 18, 2015, the entire contents of which is incorporated herein for all purposes by this reference.

TECHNICAL FIELD

The present invention relates to an apparatus for attaching and detaching a cover of a bait casting reel, and more particular, to an apparatus for attaching and detaching a cover of a bait casting reel capable of preventing loss or damage of the cover separated from the bait casting reel.

BACKGROUND ART

In general, a reel is classified into a spinning reel which uses paste or earthworm as a bait, and a bait casting reel which uses an artificial bait made as a model (e.g., small fish or worm).

Here, in the bait casting reel, a spool is installed on the inside of a reel main body equipped with a rotary handle at one end, when turning the rotary handle, the relaxed fishing line is wound on a spool, and a reel cover that supports the spool is coupled to the other end of the main body.

With such a bait casting reel, fishing is performed by gradually rotating the rotary handle after the artificial bait is tied to the tip of the fishing line and is thrown into the water.

At this time, the artificial bait is moved in a winding direction of the fishing line, while the fishing line is wound on the spool, and the fish confuses and bites it as a living bait.

Thus, since the bait casting reel repeats the operation after throwing the fishing line, a phenomenon in which the fishing line wound on the spool is frequently twisted occurs, and thus, it is necessary to separate the reel cover to untwist the twisted fishing line.

PRIOR ART

Patent Document (Patent Document 001) Korean Registered Utility Model Publication No. 20-0265270 A (2002 Feb. 6)

DISCLOSURE

Technical Problem

An object of the present invention is to provide an apparatus for attaching and detaching a cover of a bait casting reel capable of preventing loss or damage of the cover, by preventing the cover separated from the bait casting reel from being detached from the bait casting reel by being connected to the holder.

Technical Solution

According to an aspect of the present invention, there is provided an apparatus for attaching and detaching a cover of a bait casting reel which includes a reel main body which is formed with an opening portion on one side, and inside which a spool is rotatably installed; a reel cover which supports the rotation of the spool, and opens and closes the opening portion by horizontally moving from one side of the reel main body so that the spool is separated from the reel main body; and a holder which connects the reel main body with the reel cover, projects from the reel main body to guide an opening and closing path of the reel cover when the opening portion is opened, and is coupled with the reel cover by a magnetic body internally provided to fix a separation position of the reel cover.

Here, the reel cover may be equipped with a reel cover main body coupled to one side of the reel main body to open and close the opening portion, and a separating means which is coupled to the reel cover main body, constraints and releases a fixing pin protruding from the opening portion through the pressing operation, and is formed so that reel cover main body is separated from the reel main body.

Moreover, the reel main body may be equipped with a first frame inside which is equipped with a clip to constrain the projection of the holder, and a second frame which is formed to be spaced apart from the first frame, is provided so that the holder penetrates, and is formed so that the magnetic body is seated during movement of the holder by mounting of the reel cover.

The holder may be equipped with a holder main body which is formed to protrude from the reel main body through the first frame and the second frame and is equipped with a magnetic body housing portion in which the magnetic body housing portion is housed; and an elastic member which is installed to surround an outer circumferential surface of the holder main body between the magnetic body housing portion and the second frame and provides an elastic force during movement for separating the reel cover.

Also, the first frame may be formed with a housing space which houses an end portion of the holder main body which moves as the reel cover is mounted on the reel main body.

Here, the holder main body may be formed so that a shape of the end portion positioned on the first frame has a step so as to be located by being hooked to the clip.

Meanwhile, the reel cover may be equipped with a magnetic body mounting portion which is installed at a position corresponding to a position of the magnetic body housing portion, and in which a magnetic body having polarity opposite to the magnetic body is housed.

The present invention has an advantage of being able to prevent lost or damage of the cover, by preventing the cover separated from the bait casting reel from being detached from the bait casting reel by being connected to the holder.

Furthermore, the present invention has an advantage of being able to completely separate the cover from the bait casting reel by the force of the user, since the cover is coupled to the holder protruding from the bait casting reel through the sliding movement by magnetism.

BEST MODE FOR THE INVENTION

Figure 1:
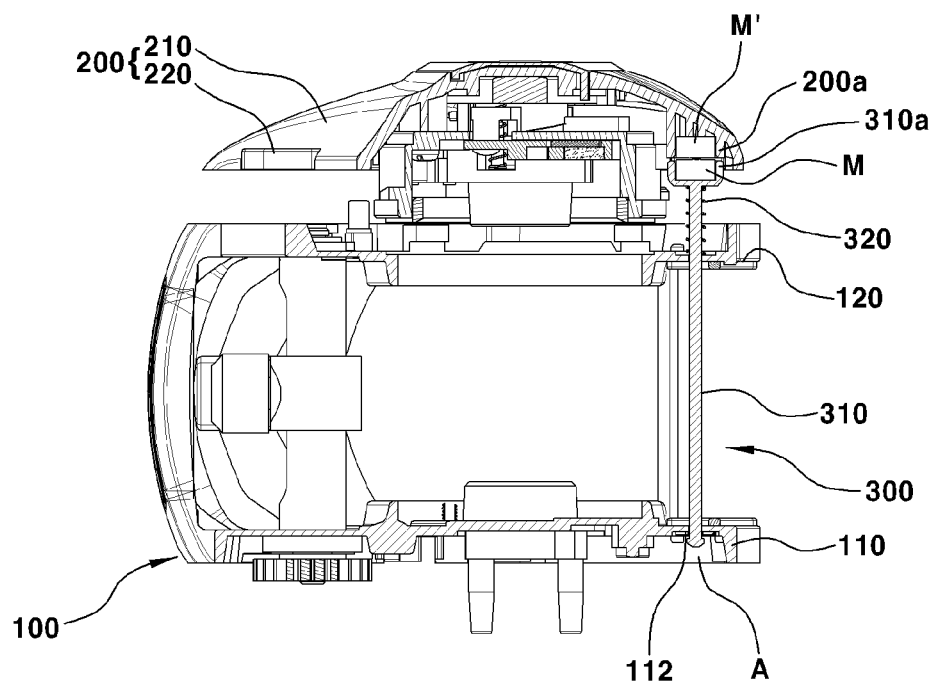
FIG. 1 is a cross-sectional view of an apparatus for attaching and detaching a cover of a bait casting reel according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, preferred embodiment of the present invention will be described with reference to the accompanying drawings.

Advantages and features of the present invention and methods of achieving the same will be understood more readily when reference to the embodiments to be described in detail in conjunction with the accompanying drawings.

However, the present invention will be embodied in many different forms rather than being limited by the examples disclosed below, and these examples merely makes the disclosure of the present invention complete and are provided to fully convey the concept of the invention to those of ordinary skill in the art to which this invention pertains, and the present invention only will be defined by the categories of claims.

Also, when it is determined that the relevant prior art or the like may make the subject matter of the present invention unclear in describing the present invention, the detailed description thereof will be omitted.

Figure 2:
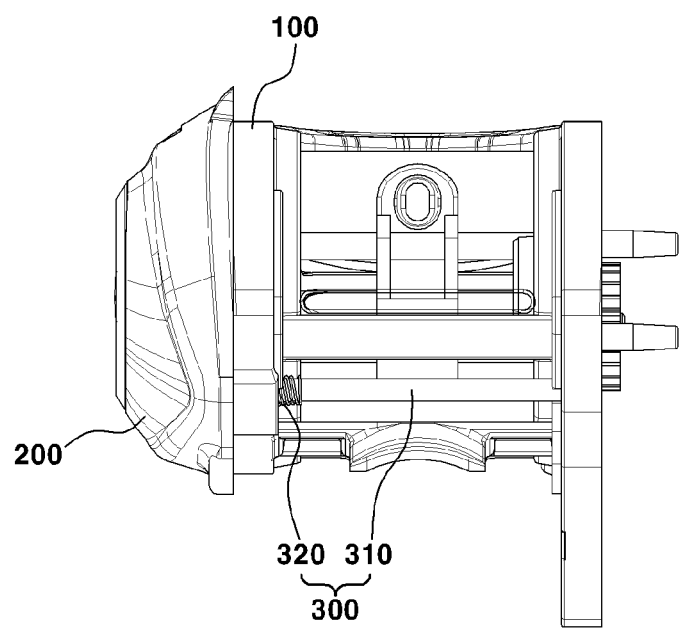
FIG. 2 is a diagram showing an attached state of the reel cover of the apparatus for attaching and detaching the cover of the bait casting reel according to an embodiment of the present invention.

FIG. 1 is a cross-sectional view of an apparatus for attaching and detaching a cover of a bait casting reel according to an embodiment of the present invention, and FIG. 2 is a diagram showing an attached state of the reel cover of the apparatus for attaching and detaching the cover of the bait casting reel according to an embodiment of the present invention.

As shown in FIGS. 1 and 2, the apparatus for attaching and detaching the cover of the bait casting reel includes a reel main body 100, a reel cover 200 and a holder 300.

First, the reel main body 100 corresponds to a frame which forms an external form of the bait casting reel, a spool around which a fishing line is wound is pivotally coupled therein and is rotatably installed, and an opening portion is formed on one side for the entry and exit of the spool.

The reel main body 100 is equipped with a first frame 110 and a second frame 120 so that the holder 300 to be described later can be installed.

A clip 112 is provided inside the first frame 110 so as to restrain the projection of the holder 300 which moves toward the one side of the reel main body 100.

The second frame 120 is formed to be spaced apart from the first frame 110, and is formed so that the holder 300 fixed on the first frame 110 and having a predetermined length penetrates.

Further, in the second frame 120, when a reel cover 200 to be described later is mounted on one side of the reel main body 100, the reel cover 200 presses the holder 300 to push the holder 300 toward the inside of the reel main body 100, and at this time, a seating space is provided so that a magnetic body housing portion 310a coupled to the holder 300 is locked and seated.

The reel cover 200 is coupled to the rotary shaft of the spool to support the rotation of the spool when coupled to the reel main body 100, and moves horizontally on one side of the reel main body 100 to open and close the opening portion when separated from the reel main body 100.

For example, after the fishing line is thrown, since the normal rotation or the reverse rotation of the spool is repeated, the fishing line wound around the spool is frequently twisted.

In such a case, the reel cover 200 can easily remove the twisted fishing line wound around the spool, by selectively opening and closing the opening portion such that only the spool around which the fishing line is wound can be separated from one side of the reel main body 100, rather than disassembling the entire reel main body 100 to loosen the twisted fishing line.

However, when the reel cover 200 is separated from one side of the reel main body 100, since a separating position is not fixed and rather a user directly holds the reel cover 200 during the time of removing the twisted fishing line, there is a risk of loss, and there is always a risk of damage due possession problems such as dropping.

Therefore, in order to solve such problems, the apparatus for attaching and detaching the cover of the bait casting reel of the present embodiment includes a holder 300.

The holder 300 connects the reel main body 100 and the reel cover 200, and protrudes from the reel main body 100 when opening the opening portion to guide the opening and closing path of the reel cover 200.

That is, the holder 300 has a predetermined length, its one end portion is coupled to the first frame 110, and the other end portion protrudes to one side of the reel main body 100 through the second frame 120. At this time, by allowing the protruding other end portion and the reel cover 200 to be coupled by magnetism, it is possible to fix the position of the reel cover 200 which opens the opening portion.

In other words, when the holder 300 rotates by a predetermined angle in one direction in a state in which the reel cover 200 is separated from the reel main body 100, a magnetic body provided at an end portion of the holder 300 is coupled to a magnetic body M' installed in a magnetic body installation portion 200a corresponding to the position of the magnetic body M, and thus, by allowing the holder 300 and the reel cover 200 to be coupled to each other, it is possible to separate the separation position of the reel cover 200 from one side of the reel main body 100.

Such a holder 300 is equipped with a holder main body 310 and an elastic member 320.

The holder main body 310 has a predetermined length, is formed so as to protrude from one side of the reel main body 100 through the first frame 110 and the second frame 120, and is equipped with a magnetic body housing portion 310a in which the magnetic body M is housed.

Here, since the shape of the end portion of the holder main body 310 coupled to the first frame 110 is formed to be larger than the diameter of the holder main body 310 to have a step, the holder main body 310 is located by being hooked to a clip 112 installed on the first frame 110, and consequently, it is possible to prevent the holder main body 310 from being completely discharged to one side of the reel main body 100 by the elastic member 320 which will be described later.

The elastic member 320 is preferably formed of a spring, and is installed to surround the outer peripheral surface of the holder main body 310 between the magnetic body housing portion 310a and the second frame 120.

The elastic member 320 provides an elastic force to the reel cover 200 during movement of the holder main body 310 for the separation of the reel cover 200.

That is, when separating the reel cover 200 from the reel main body 100 through the rotation of the reel cover 200 in the state of pressing the separating means 220 on one side of the reel main body 100, the elastic member 320 allows the reel cover 200 to be quickly spaced apart from the opening portion by the elastic force.

Accordingly, in this embodiment, since the reel cover 200 rapidly separated from the reel main body 100 by an elastic member 320 is connected to the holder 300, it is possible to prevent the reel cover 200 from being detached to the outside, and thus, there is no need for separate storage even during the separation of the reel cover 200.

The apparatus for attaching and detaching the cover of the bait casting reel of the present embodiment is formed to allow rotational movement of the holder 300 to the shaft by the load in a separated state of the reel cover 200, consequently, the opening portion is fully opened, and thus, it is possible to easily discharge the spool around which the twisted fishing line is wound without completely removing the reel cover 200.

Meanwhile, the first frame 110 is formed with a housing space A which houses an end portion of the holder main body 310, when the reel cover 200 moves so as to be mounted on the reel main body 100.

In other words, the housing space A is formed on the first frame 110 so that the holder main body 310 extruded by pressing of the reel cover 200 is housed, allows the holder main body 310 to be easily moved inside the reel main body 100, and since the holder main body 310 is not disengaged from the first frame 110 by the clip 112, it is possible to stably house the holder main body 310.

Figure 3:
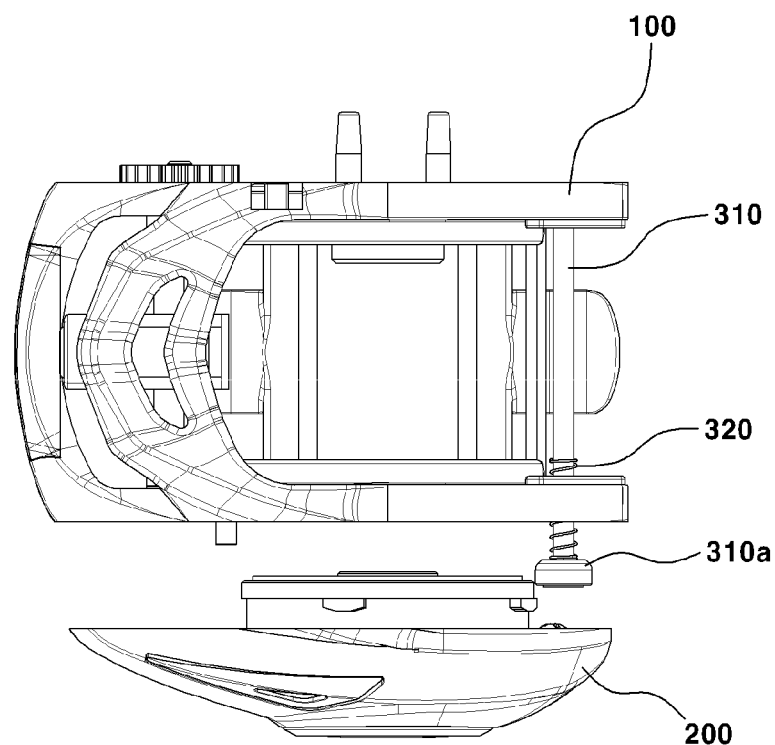
FIG. 3 is a diagram illustrating the removal of the reel cover of the apparatus for attaching and detaching the cover of the bait casting reel according to an embodiment of the present invention.

Hereinafter, FIG. 3 is a diagram illustrating the removal of the reel cover of the apparatus for attaching and detaching the cover of the bait casting reel according to an embodiment of the present invention.

As shown in FIG. 3, the apparatus for attaching and detaching the cover of the bait casting reel includes a holder 300 which connects the reel main body 100 with the reel cover 200 to fix the separation position on the reel main body 100 during the separation of the reel cover 200.

Here, the holder 300 is coupled to the reel cover 200 by the magnetic bodies M, M', and thus, it is possible to effectively fix the separation position of the reel cover 200 separated from one side of the reel main body 100.

That is, since a magnetic body housing portion 310a which houses the magnetic body M is installed on the holder main body 310, and a magnetic body housing body 200a which houses a magnetic body M' having the polarity opposite to the magnetic body M is installed on the reel cover 200, the holder 300 and the reel cover 200 are coupled to each other by a magnetic force, and thus, the separation position of the reel cover 200 separated from the reel main body 100 can be fixed by the holder 300.

Since the holder 300 and the reel cover 200 are coupled to each other by magnetic force, they can be separated from each other by a predetermined force of the user.

For example, when the spool needs to be completely separated from the reel main body 100, since the reel cover 200 is spaced apart from the reel main body 100 by the length of the holder 300 that protrudes from the reel main body 100 and the separation position is fixed, the separated spool can be blocked by the reel cover 200.

Also, when there is a need for cleaning of the reel cover 200, the internal cleaning of the reel cover 200 may be difficult in the state in which the reel cover 200 is coupled to the holder 300.

Thus, in this embodiment, by forcibly separating the reel cover 200 from the holder 300, the opening of the reel main body 100 can be securely opened, and consequently, it is possible to easily separate the spool along the opening portion of the reel main body 100, and simultaneously, allow the efficient internal cleaning of the reel cover 200.

Figure 4:
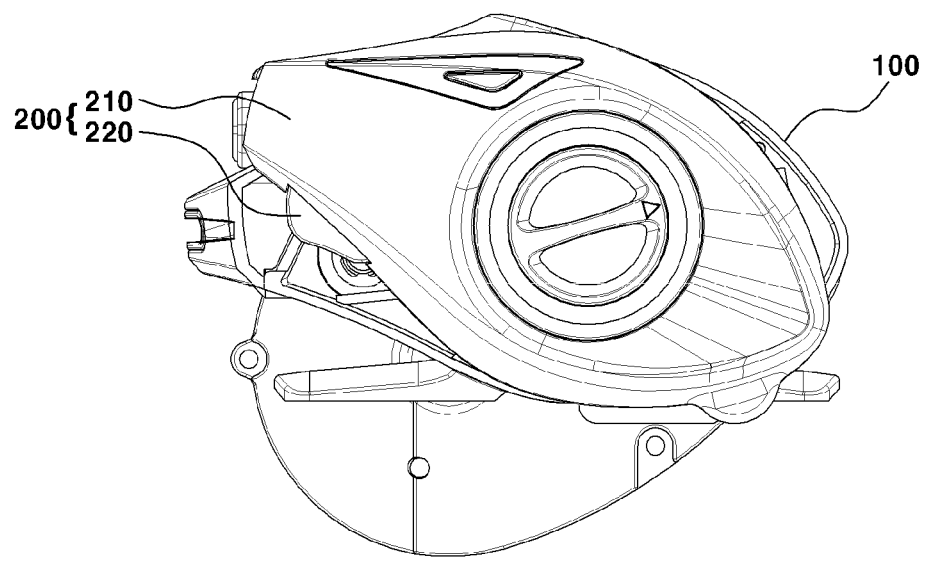
FIG. 4 is a side view of the reel cover of the apparatus for attaching and detaching the cover of the bait casting reel according to an embodiment of the present invention.

Hereinafter, FIG. 4 is a side view of a reel cover of the apparatus for attaching and detaching the cover of the bait casting reel according to an embodiment of the present invention.

As shown in FIG. 4, the bait casting reel includes a reel cover 200 which moves in the horizontal direction from one side of the reel main body 100 to open and close the opening so that the spool is separated from the reel main body 100.

The reel cover 200 according to this embodiment is equipped with a reel cover main body 210 and a separating means 220.

First, the reel cover main body 210 is provided in the same shape as one side shape of the reel main body 100, and is coupled to the reel main body 100 to open and close the opening portion.

The separating means 220 is made to protrude from an outer circumferential surface of the reel cover main body 210 so that the pushing operation can be performed.

The separating means 220 constrains and releases a fixing pin (not shown) protruding from the opening portion in a rotary shaft direction of the spool through the pressing operation by pressing, and the reel cover main body 210 is formed to be separated from the reel main body 100 accordingly.

For example, the separation means 220 can release the restraint of a fixing pin (not shown), by pushing a locking member (not shown) provided on the reel cover main body 210 by the pressing force during the pushing operation, and when rotating the reel cover main body 210 along the circumferential direction in this state, the locking member (not shown) is completely disengaged from the fixing pin (not shown).

Here, when a protruding jaw (not shown) installed in the reel cover main body 210 is positioned between a plurality of protruding pieces installed on the opening portion by further rotating the reel cover main body 210, the reel cover main body 210 is separated from the reel main body 100.

At this time, since the reel cover main body 210 is coupled to the reel main body 100 by magnetism around the holder 300 as a shaft, even when the reel cover main body 210 is separated from the reel main body 100, the separation position can be fixed, and it is possible to prevent the loss of the separated reel cover 200 accordingly.

In addition, as described above, when the protruding jaw (not shown) is positioned between a plurality of protruding pieces (not shown) installed on the opening portion, since the holder 300 rapidly protrudes by the elastic member 320, and consequently, the reel cover main body 210 connected to the holder 300 can be easily separated from the reel main body 100.

The present invention has an advantage of being able to prevent the lost or damage of the cover, by allowing the cover separated from the bait casting reel to be connected to the holder to prevent from being detached from the bait casting reel.

Furthermore, the present invention has an advantage of being able to completely separate the cover from the bait casting reel by the force of the user, since the cover is coupled to the holder protruding from the bait casting reel through the sliding movement by magnetism.

Although the present invention has been described with reference to the embodiment(s) shown in the drawings, this is merely an exemplary, it would be appreciated by those skilled in the art that all or a part of the above-mentioned embodiment(s) may be configured by being selectively combined. Therefore, the true technical protection scope of the present invention should be defined by the technical spirit of the scope of the appended claims registered.

The invention claimed is:

1. An apparatus for attaching and detaching a cover of a bait casting reel comprising:
    a reel main body which is formed with an opening portion on one side of the reel main body, and inside which a spool is rotatably installed;
    a reel cover which supports the rotation of the spool, and opens and closes the opening portion by horizontally moving from the one side of the reel main body so that the spool is separated from the reel main body; and
    a holder which connects the reel main body with the reel cover, projects from the reel main body to guide an opening and closing path of the reel cover when the opening portion is opened, and is coupled with the reel cover by a first magnetic body internally provided to fix a separation position of the reel cover,
    wherein the reel cover is equipped with a magnetic body installation portion which is installed at a position corresponding to a position of a magnetic body housing portion, and in which a second magnetic body having polarity opposite to the first magnetic body is housed.

2. The apparatus of claim 1, wherein the reel cover comprises:
    a reel cover main body coupled to the one side of the reel main body to open and close the opening portion; and
    a separating means which is coupled to the reel cover main body, constrains and releases a fixing pin protruding from the opening portion through a pressing operation, and is formed so that the reel cover main body is separated from the reel main body.

3. The apparatus of claim 1, wherein the reel main body comprises:
    a first frame inside which is equipped with a clip to constrain a projection of the holder, and
    a second frame which is formed to be spaced apart from the first frame, is provided so that the holder penetrates, and is formed so that the first magnetic body is configured to be seated to the second frame during movement of the holder toward the reel main body by mounting of the reel cover.

4. The apparatus of claim 3, wherein the holder comprises:
    a holder main body which is formed to protrude from the reel main body through the first frame and the second frame and has the magnetic body housing portion in which the first magnetic body is housed; and
    an elastic member which is installed to surround an outer circumferential surface of the holder main body between the magnetic body housing portion and the second frame and provides an elastic force during movement for separating the reel cover.

5. The apparatus of claim 4, wherein the first frame is formed with a housing space which houses an end portion of the holder main body which moves as the reel cover is mounted on the reel main body.

6. The apparatus of claim 4, wherein the holder main body is formed so that a shape of an end portion positioned on the first frame has a step so as to be located by being hooked to the clip.

* * * * *